(12) United States Patent
Rong et al.

(10) Patent No.: US 7,220,392 B2
(45) Date of Patent: May 22, 2007

(54) FUEL CONVERSION REACTOR

(75) Inventors: Xiaoyang Rong, Toronto (CA); Brian E. Cheadle, Bramalea (CA)

(73) Assignee: Dana Canada Corporation (CA)

( * ) Notice: Subject to any disclaimer, the term of this patent is extended or adjusted under 35 U.S.C. 154(b) by 577 days.

(21) Appl. No.: 10/443,397

(22) Filed: May 22, 2003

(65) Prior Publication Data

US 2004/0123523 A1 Jul. 1, 2004

(30) Foreign Application Priority Data

Dec. 31, 2002 (CA) .................................. 2415536

(51) Int. Cl.
*F28D 21/00* (2006.01)
*B01J 8/00* (2006.01)
*B01J 19/00* (2006.01)
*B01J 10/00* (2006.01)

(52) U.S. Cl. .................... 422/201; 48/127.9; 165/66; 422/129; 422/138; 422/134; 422/135; 422/187; 422/188; 422/189; 422/192; 422/198; 422/211; 422/204; 422/205

(58) Field of Classification Search .............. 422/198, 422/201, 129, 173, 138; 165/177, 81, 82, 165/158, 159, 162, 176

See application file for complete search history.

(56) References Cited

U.S. PATENT DOCUMENTS 2,612,350 A 9/1952 Stadler ..................... 165/82

(Continued)

FOREIGN PATENT DOCUMENTS

| DE | 23 41 808 A1 | 8/1973 |
| EP | 1 094 030 A2 | 4/2001 |
| FR | 1274228 | 11/1960 |
| FR | 1480125 | 5/1965 |
| GB | 1387044 | 3/1975 |
| WO | WO 03/080230 A1 | 10/2003 |

OTHER PUBLICATIONS

D. Krause et al., "Autothermal Reforming Catalysts", Abstracts from 2002 Fuel Cell Seminar, Nov. 18-21, 2002, Palm Springs, California, pp. 571-573.

(Continued)

*Primary Examiner*—Glenn Caldarola
*Assistant Examiner*—Kaity Handal
(74) *Attorney, Agent, or Firm*—Dykema Gossett PLLC

(57) ABSTRACT

A fuel conversion reactor includes a shell-and-tube heat exchanger for controlling the temperature of a hot gaseous mixture produced by catalytic or non-catalytic reaction of a fuel with a gaseous fluid, and for controlling the temperature of the gaseous fluid and/or the fuel prior to the reaction. The reactor is either a catalytic or non-catalytic burner, or a fuel reformer for converting a fuel to hydrogen. A preferred reactor includes an outer shell having first and second ends and an inner surface, a primary inner shell extending into the outer shell, the primary inner shell defining a heat exchanging chamber and having primary and secondary ends, and a secondary inner shell having a first end located adjacent the secondary end of the primary inner shell. One or more outlet apertures are formed between the two inner shells for passage of the gaseous fluid out of the heat exchanging chamber. There are also a plurality of heat exchange tubes extending through the heat exchanging chamber between first and second tube sheets and connected to same. The first tube sheet is mounted in the primary inner shell while the second tube sheet is connected to the secondary inner shell. The tubes form passages for flow of the hot gaseous mixture in heat exchange contact with the gaseous fluid through the heat exchanging chamber, thereby preheating the gaseous fluid prior to reaction with the fuel. The adjacent ends of the inner shells form a disconnected joint and the secondary inner shell is free to move relative to the primary inner shell upon thermal expansion of the tubes.

21 Claims, 10 Drawing Sheets

U.S. PATENT DOCUMENTS

| | | | |
|---|---|---|---|
| 2,672,849 A | 3/1954 | Fruit | 48/127.9 |
| 3,467,504 A | 9/1969 | Korwin | 280/31 |
| 3,909,299 A | 9/1975 | Corrigan | 33/639 |
| 4,049,048 A | 9/1977 | Leedham | 165/159 |
| 4,113,441 A | 9/1978 | Suzuki et al. | 422/197 |
| 4,249,596 A | 2/1981 | Tutak et al. | 165/113 |
| 4,434,846 A | 3/1984 | Lu | 165/161 |
| 4,904,455 A * | 2/1990 | Karafian et al. | 422/201 |
| 4,942,022 A | 7/1990 | Kasai et al. | 422/201 |
| 5,048,596 A | 9/1991 | Lu | 165/41 |
| 5,248,566 A | 9/1993 | Kumar et al. | 429/19 |
| 5,382,271 A | 1/1995 | Ng et al. | 48/61 |
| 5,434,846 A | 7/1995 | Tremel et al. | 370/252 |
| 5,484,577 A | 1/1996 | Buswell et al. | 422/211 |
| 5,518,705 A * | 5/1996 | Buswell et al. | 423/437.2 |
| 5,762,658 A | 6/1998 | Edwards et al. | 48/127.7 |
| 5,772,707 A | 6/1998 | Wiesheu et al. | 48/197 R |
| 5,888,355 A | 3/1999 | Mikitenko et al. | 422/191 |
| 5,915,472 A | 6/1999 | Takikawa et al. | 165/158 |
| 5,938,800 A | 8/1999 | Verrill et al. | 48/127.9 |
| 5,989,503 A | 11/1999 | Wiesheu et al. | 422/198 |
| 6,033,793 A | 3/2000 | Woods et al. | 429/17 |
| 6,077,620 A | 6/2000 | Pettit | 429/26 |
| 6,123,913 A | 9/2000 | Clawson et al. | 423/652 |
| 6,126,908 A | 10/2000 | Clawson et al. | 422/190 |
| 6,179,048 B1 | 1/2001 | Shelton et al. | 165/134.1 |
| 6,232,005 B1 | 5/2001 | Pettit | 429/19 |
| 6,444,179 B1 * | 9/2002 | Sederquist | 422/191 |
| 2002/0146359 A1 * | 10/2002 | Lomax et al. | 422/198 |
| 2005/0129593 A1 * | 6/2005 | Hotta et al. | 422/201 |

OTHER PUBLICATIONS

S. Wieland et al., "New Catalysts for Autothermal Reforming of Gasoline and Water Gas Shift Reaction", Abstracts from 2000 Fuel Cell Seminar, Oct. 30-Nov. 2, 2000, Portland, Oregon, pp. 309-312.

D. Bloomfield, "Hydrocarbon Fuel Processing for Fuel Cell Power Plants", Abstracts from 2000 Fuel Cell Seminar, Oct. 30-Nov. 2, 2000, Portland, Oregon, pp. 329-332.

Seki et al., "Development of Fuel Processing Systems for PEFC Residential Stationary Application", Abstracts from 2000 Fuel Cell Seminar, Oct. 30-Nov. 2, 2000, Portland, Oregon, pp. 376-379.

J. Larminie and A. Dicks, Fuel Cell Systems Explained, Chapter 6 entitled "Medium and High Temperature Fuel Cells", pp. 124-127, published by John Wiley & Sons Ltd., Feb. 2001.

Chaper 8 entitled Compressors, Turbines, Ejectors fans, blowers and pumps.

Derwent Abstract No. 2001-106412/12 of JP-2000315517-A, Published Nov. 4, 2000.

J. Larminie and A. Dicks, "Fuell Cell Systems Explained," Chapter 7 Entitled "Fueling Fuel Cells," pp. 181-228, Published by John Wiley & Sons Ltd., Feb. 2001.

International Search Report Issued by European Patent Office in International App. No. PCT/CA03/02029 (May 6, 2004).

* cited by examiner

FUEL CONVERSION REACTOR

FIELD OF THE INVENTION

This invention relates to fuel conversion reactors, and more specifically to burners and fuel reformers for use in fuel cell systems.

BACKGROUND OF THE INVENTION

The use of fuel cells has become of increasing interest in recent years for the application of power generation by means of a stationary installation and for purposes of transportation where the fuel cell is transported with the vehicle. The fuel of these fuel cells is commonly hydrogen that has been produced by reacting a hydrogen-containing fuel, usually a hydrocarbon or a low molecular weight alcohol, over one or more catalysts in a fuel reformer.

There are a number of known processes for generating hydrogen from hydrogen-containing fuels in a fuel reformer. A first known process for conversion of hydrogen-containing fuels to hydrogen is known as "steam reformation", which is conducted at elevated temperatures. In the case of a hydrocarbon fuel, steam reformation proceeds via the following reaction, which is generally endothermic:

$$C_nH_m + nH_2O \rightarrow nCO + (m/2+n)H_2.$$

One difficulty with steam reformation is that external heat may be required to drive the reaction forward to produce hydrogen and carbon monoxide. External heat can be supplied to the steam reformation catalyst from a number of sources, and is transmitted to the catalyst bed using heat exchangers. Some of the external heat may be supplied by passing the high temperature reformate produced by the catalytic steam reformation through a regenerative heat exchanger, thereby returning some of the heat of the high temperature gas to the endothermic reforming reaction. Alternatively, the external heat may be generated by combustion of anode off-gases and/or other fuels in a burner. The combustion reaction taking place in the burner can be catalyzed or non-catalyzed. Examples of catalytic and non-catalytic burners are described in U.S. Pat. No. 6,232,005 issued to Pettit.

A second known process for converting hydrogen-containing fuels to hydrogen is known as "partial oxidation", which proceeds via the following exothermic reaction:

$$C_nH_m + n/2\ O_2 \rightarrow nCO + m/2\ H_2.$$

Partial oxidation can be performed at high temperatures (about 1200 to 1500° C.) without a catalyst, or can be performed with a catalyst at much lower temperatures, typically about 500 to 800° C. One disadvantage of partial oxidation is that it produces less hydrogen per molecule of hydrogen-containing fuel than steam reformation, since some of the fuel is consumed by oxidation. Since the oxidation is exothermic, there is no need for the provision of external heat through a heat transfer surface.

A third known process for converting hydrogen-containing fuels to hydrogen is "autothermal reformation", in which fuel, water and oxygen, usually in the form of air, are reacted in the presence of a catalyst to generate a hydrogen-rich fuel gas. Autothermal reformation can be viewed as a combination of two reactions, an exothermic partial oxidation and an endothermic steam reformation, with the net heat of reaction being determined by the ratios of oxygen to fuel and water to fuel. Generally, these ratios are established so that the net heat of reaction is slightly exothermic, thereby eliminating the need for application of external heat, resulting in a relatively simple system design which makes autothermal reforming attractive for practical applications.

As can be seen from the chemical reactions depicted above, considerable amounts of carbon monoxide are produced during conversion of the hydrogen-containing fuel. To avoid poisoning of the fuel cell, the level of carbon monoxide in the reformate must be reduced to a low level. This is particularly true for proton exchange membrane (PEM) fuel cells, which have a low tolerance for carbon monoxide. Thus, the reformate is typically subjected to at least one "carbon monoxide cleanup" reaction, which preferably comprises one or more water/gas shift reactions and/or a preferential oxidation reaction, in which carbon monoxide present in the reformate is consumed in a catalytic reaction with oxygen or water (steam).

Regardless of the specific conversion process utilized, significant thermal stresses are exerted on fuel conversion reactors, which can have a detrimental effect on durability. Designers of such reactors have therefore sought to reduce thermal stresses in the mechanical design of these units.

There are two conventional design approaches to overcome the problem of thermal stress in a fuel conversion reactor. The first is to reduce the stress levels by permitting thermal expansion of components of the reactor, and the second is to increase the strength of the reactor structure or the materials used in the structure so that the maximum operating stress will not exceed the maximum design strength.

One well known type of heat exchanger that is used in a wide variety of applications including boilers and other high temperature heat exchangers is known as the "tube bundle" structure, also called a "shell and tube" heat exchanger. Reference can be made to sections 3.1.2. and 4.2.3 of the Heat Exchanger Design Handbook, 1998, by G. F. Hewitt for a discussion of this type of heat exchanger. There are a variety of such heat exchangers including a fixed tube sheet or fixed head type. In this type there is an exterior metal shell which can, for example, be cylindrical and mounted within this shell are two spaced apart tube sheets on which a number of tubes are mounted. There are head covers or complete heads or channel covers at each end, which serve as fluid manifolds. With such a heat exchanger, the thermal expansion coefficients of the shell and the tubes during operation can cause a differential movement between them. Excessive movement of this type can cause the tubes to loosen in the tube sheets. One known way for overcoming the problem of differential movements is to provide a shell expansion bellows.

U.S. Pat. No. 5,382,271 issued Jan. 17, 1995 to Industrial Technology Research Institute, describes a compact tube and shell structure for hydrogen generation where a catalyst is used in the water-shift reaction in order to reduce the level of carbon monoxide in the outflowing gases. Two tube sheets are mounted near opposite ends of a cylindrical shell and first and second sets of partition plates are mounted between the tube sheets. A plurality of tubes extend between the tube sheets and through the partition plates. There is a porous metal layer arranged immediately below the upper tube sheet and then catalyst material is arranged below this layer. There is an exhaust gas chamber and an exhaust outlet provided below the bottom tube sheet. Combustible gas flows into the shell body by means of an inlet in the upper end. A feed inlet is located in one side of the shell body just below the upper tube sheet. For certain types of hydrocarbons, a catalyst used for the steam reforming step is placed in the middle section while another catalyst used in the last section just above the bottom tube sheet is for the water-gas shift reaction.

With this known device, combustible gas enters the upper chamber formed in the shell above the upper tube sheet and, after combustion, the exhaust gas at a very high temperature passes through the tubes in order to enter an exhaust gas chamber at the bottom. The heat of the exhaust gas is transferred to the porous metal layer and the catalyst(s) while the exhaust gas passes through the tubes. This heat exchange also decreases the temperature of the exhaust gas. With this known hydrogen generator structure, there can be a thermal expansion problem if the tubes expand at a different rate than the shell as the tubes are apparently rigidly mounted in the tube sheets which in turn are rigidly mounted in the shell.

SUMMARY OF THE INVENTION

The present invention provides an improved fuel conversion reactor including a shell-and-tube heat exchanger for controlling the temperature of the hot gaseous mixture following the reaction and controlling the temperature of the incoming gases prior to the reaction.

According to one aspect of the invention, the reactor comprises a fuel conversion reactor including a shell-and-tube heat exchanger for preheating a gaseous fluid prior to catalytic or non-catalytic reaction with a fuel. The heat exchanger includes a primary shell member having primary and secondary ends and a side wall extending between these ends and defining a heat exchanging chamber located within the shell member. There is an inlet for introducing the gaseous fluid into the heat exchanging chamber, a first tube sheet fixedly mounted on the primary shell member in the vicinity of the primary end and sealingly closing the heat exchanging chamber at one end of the chamber, and a second tube sheet device which is separate from the primary shell member and is located in the vicinity of the secondary end. The second tube sheet device forms another end of the chamber that is opposite the one end of the chamber. A plurality of heat exchange tubes extend from the first tube sheet to the second tube sheet device and are rigidly connected to both the first tube sheet and the second tube sheet device. These heat exchange tubes provide passageways for the gaseous mixture to flow inside the tubes through the heat exchanging chamber. One or more outlets are formed in at least one of the primary shell member and the second tube sheet device in the region of the secondary end of the primary shell member in order to provide at least one outlet for the gaseous fluid which flows through the heat exchanging chamber on a shell side thereof during operation of the fuel conversion reactor.

Preferably, the reactor includes an outer shell having first and second ends and an outer shell wall extending between these ends. The outer shell is closed at the second end, extends around the primary shell member and the second tube sheet device, and has an inlet for the fuel. A fuel passageway is formed between the outer shell wall and the side wall of the primary shell member and extends from the inlet for the fuel to the one or more outlet apertures.

Preferably, the second tube sheet device includes a secondary shell member having a peripheral side wall with a first end of the secondary shell member located adjacent the secondary end of the primary shell member. The first end of the secondary shell member and the secondary end of the primary shell member form a disconnected joint and thus the second tube sheet device is free to move relative to the primary shell member upon thermal expansion of the heat exchange tubes.

According to another aspect of the invention, a method of converting a fuel to a hot gaseous mixture comprises providing a heat exchanging shell apparatus defining a heat exchanging chamber and having a plurality of heat exchange tubes mounted therein so that each extends through said chamber, these tubes providing passageways for flow of the hot gaseous mixture. A gaseous fluid to be reacted with the fuel is introduced into the heat exchanging chamber and passes through the chamber, thereby causing the gaseous fluid to be heated by heat exchange with the hot gaseous mixture flowing through the tubes. The heated gaseous fluid is withdrawn from the chamber and is mixed with the fuel to provide a mixture of the fuel and the gaseous fluid. This initial mixture is reacted, optionally in the presence of a catalyst, to produce the hot gaseous mixture.

In some preferred embodiments of the invention, the reactor comprises a burner in which the fuel undergoes a catalytic or non-catalytic combustion reaction with a gaseous fluid containing oxygen, thereby producing a hot, gaseous mixture of combustion gases from which usable heat may be extracted.

In other preferred embodiments of the invention, the reactor comprises a fuel reformer in which a hydrogen-containing fuel undergoes a fuel transformation reaction with a gaseous fluid to produce a hot gaseous mixture containing hydrogen which may, for example, be utilized in a fuel cell engine. The fuel transformation reaction may preferably comprise a steam reformation, catalytic or non-catalytic partial oxidation, or an autothermal reformation process, with autothermal reformation being particularly preferred for the reasons mentioned earlier. The gaseous fluid to be reacted with the hydrogen-containing fuel preferably contains water or steam and/or an oxidant such as molecular oxygen (referred to herein as "oxygen"), depending on the fuel transformation reaction used. With the exception of non-catalytic partial oxidation, the gaseous fluid and the hydrogen-containing fuel are reacted in the presence of a suitable catalyst.

BRIEF DESCRIPTION OF THE DRAWINGS

Further features and advantages will become apparent from the following detailed description of preferred embodiments of the invention taken in conjunction with the accompanying drawings, in which.

DETAILED DESCRIPTION OF PREFERRED EMBODIMENTS

The preferred fuel conversion reactors according to the invention are described below as fuel reformers. However, it will be appreciated that any of the preferred structures described below may be equally suitable, with minor modifications, for use as catalytic or non-catalytic burners.

Figure 1:
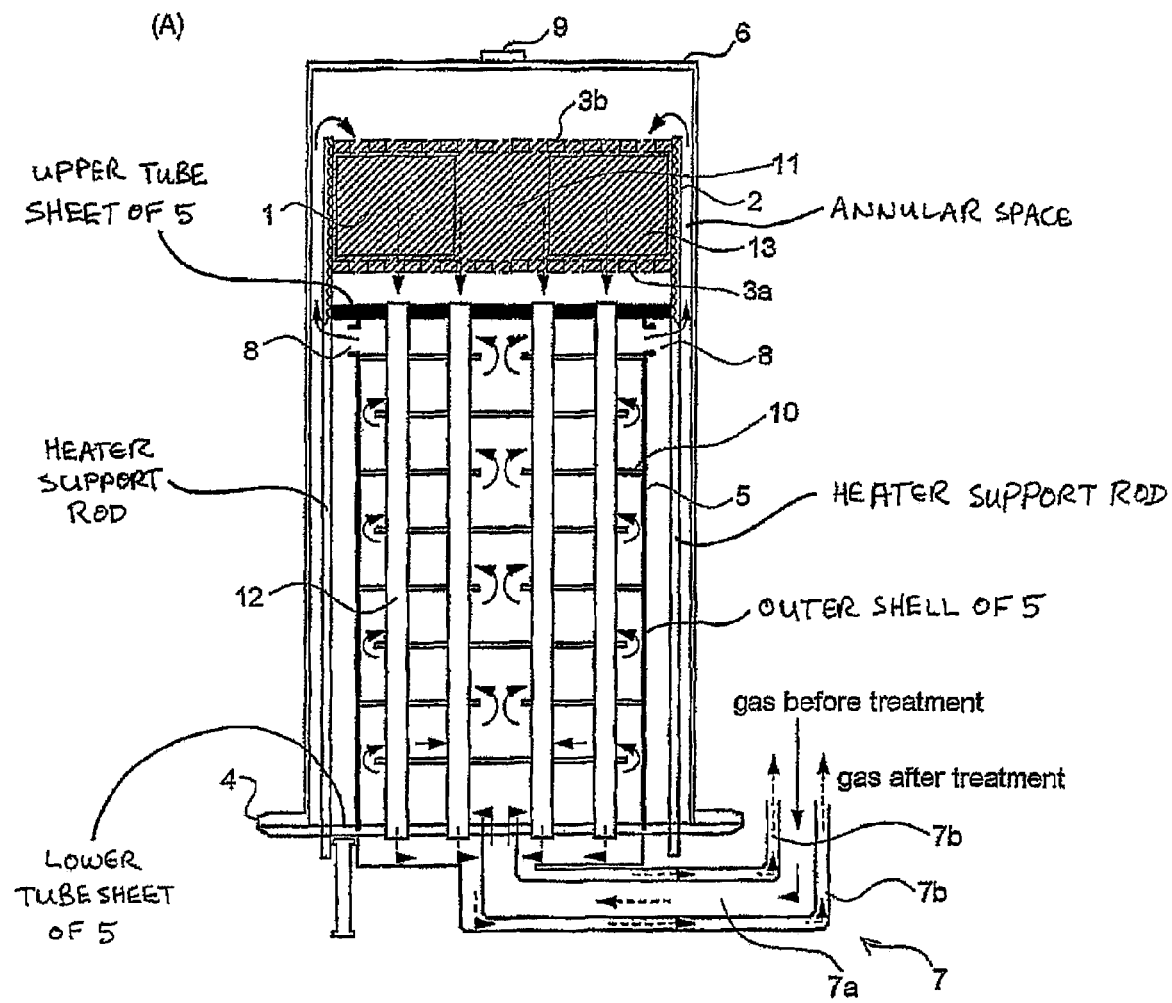
FIG. 1 is an axial cross-section of a preferred form of fuel conversion reactor, comprising a fuel reformer constructed in accordance with the invention.

FIG. 1 illustrates a first preferred fuel reformer 10 according to the invention, which is constructed for the purpose of converting hydrogen-containing fuel to hydrogen gas by means of an autothermal reformation process in which a gaseous fluid containing steam and oxygen or an oxygen-containing gas such as air undergoes a catalyzed reaction with a hydrogen-containing fuel. Where the hydrogen-containing fuel comprises a hydrocarbon, the following catalyzed reactions take place in the fuel reformer 10:

(1) Partial Oxidation (Exothermic)

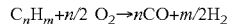

(2) Steam Reformation (Endothermic)

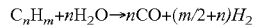

As mentioned above, the two steps of the autothermal reformation take place in the fuel reformer 10 without spatial separation, and preferably take place simultaneously in the same catalyst bed or structure.

Figure 2:
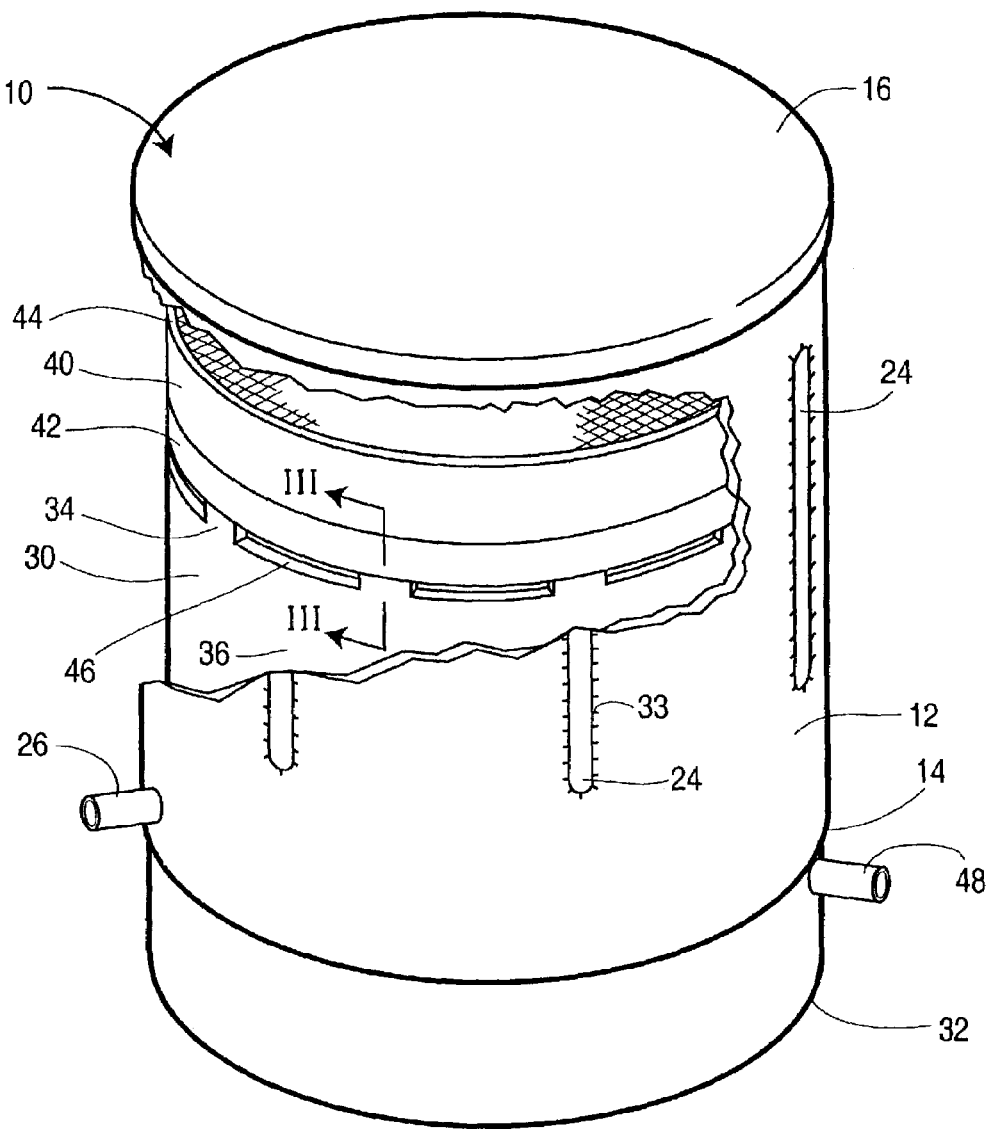
FIG. 2 is a perspective view showing one side of and the top of the fuel reformer of FIG. 1, this view having the outer shell partially broken away in order to illustrate details of the inner shells.
Figure 4A:
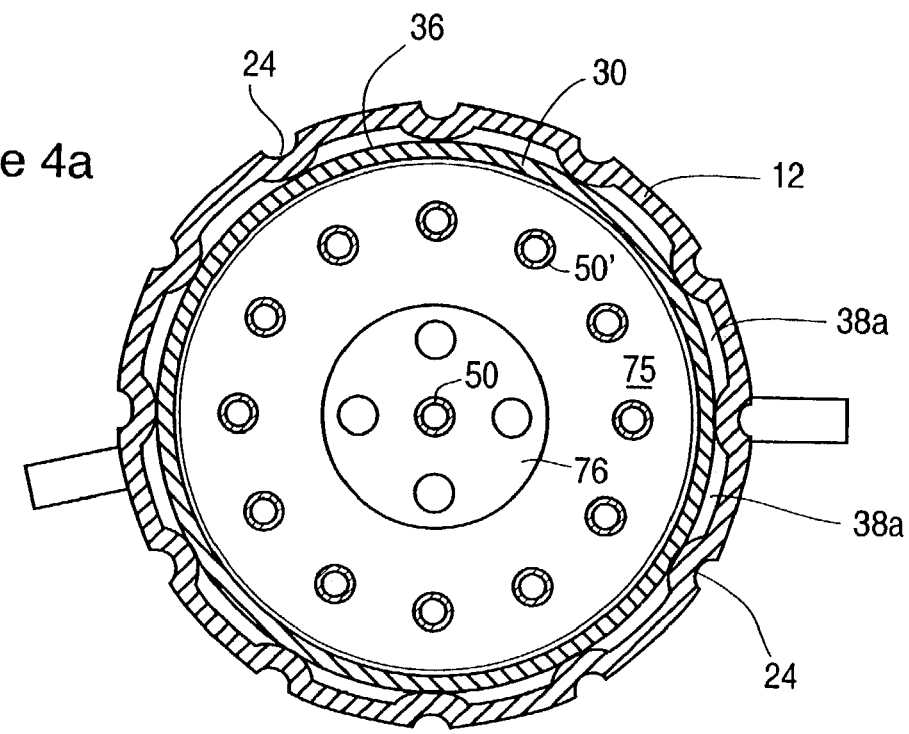
FIGS. 4a and 4b are horizontal cross-sections taken along the line IV—IV of FIG. 1.

The preferred illustrated reformer 10 includes an outer shell 12 having a first end 14 and a second end 16. The shell has a cylindrical inner surface 18 and a cylindrical external surface 20 which extend between the first and second ends. The second end is closed by means of a top cap member 22 which is fixedly attached to the cylindrical, main body of the outer shell. As shown in FIGS. 2 and 4a, there are inwardly extending projections in the form of longitudinally extending ribs 24 formed in the outer shell and these are provided for the purpose explained hereinafter. The bottom ends of the ribs are spaced away from the bottom or first end 14 of the outer shell.

Figure 12:
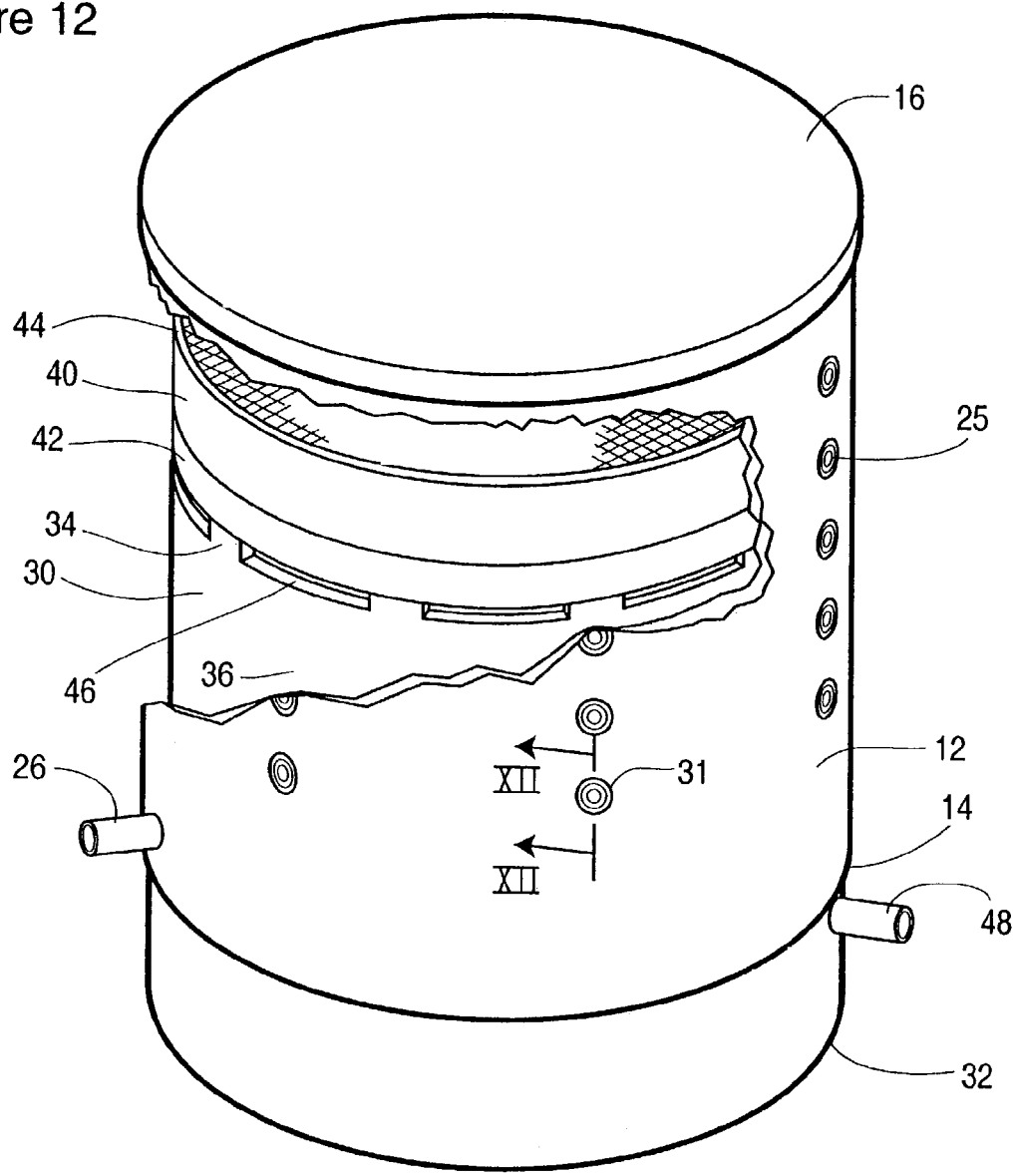
FIG. 12 is a perspective view similar to FIG. 2 but showing an alternate form of projections on the outer shell.
Figure 13:
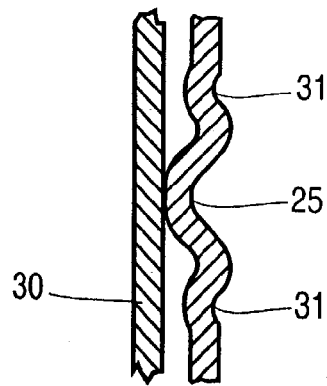
FIG. 13 is a cross-sectional detail taken along the line XII—XII of FIG. 12, this view showing the use of annular corrugations around a dimple projection.

An alternate construction of the fuel reformer 10 is illustrated in FIGS. 12 and 13. This embodiment is the same as that shown in FIG. 2 except that the outer shell 12 has inwardly extending projections in the form of round dimples 25, which serve the same purpose as the ribs 24. As shown in FIG. 12, the dimples 25 may be arranged in longitudinally extending rows, although other arrangements are possible. Although the illustrated dimples are round, obviously other shapes such as elliptical or oblong are also possible. In order to allow for thermal expansion of a primary inner shell 30 relative to the outer shell 12, each dimple may preferably be surrounded by one or two annular corrugations 31 which will allow the inner end of the dimple to be pushed outwardly by the inner shell 30 as it expands, although other arrangements are possible. In a similar manner, the ribs 24 in the embodiment of FIG. 2 can also be surrounded by one or two corrugations 33 for the same purpose. Another alternative construction is to provide the ribs or dimples on the primary inner shell 30 (and also on a secondary inner shell 40 described below), in which case the ribs or dimples project outwardly to engage the inner surface of the outer shell 12.

Figure 4B:
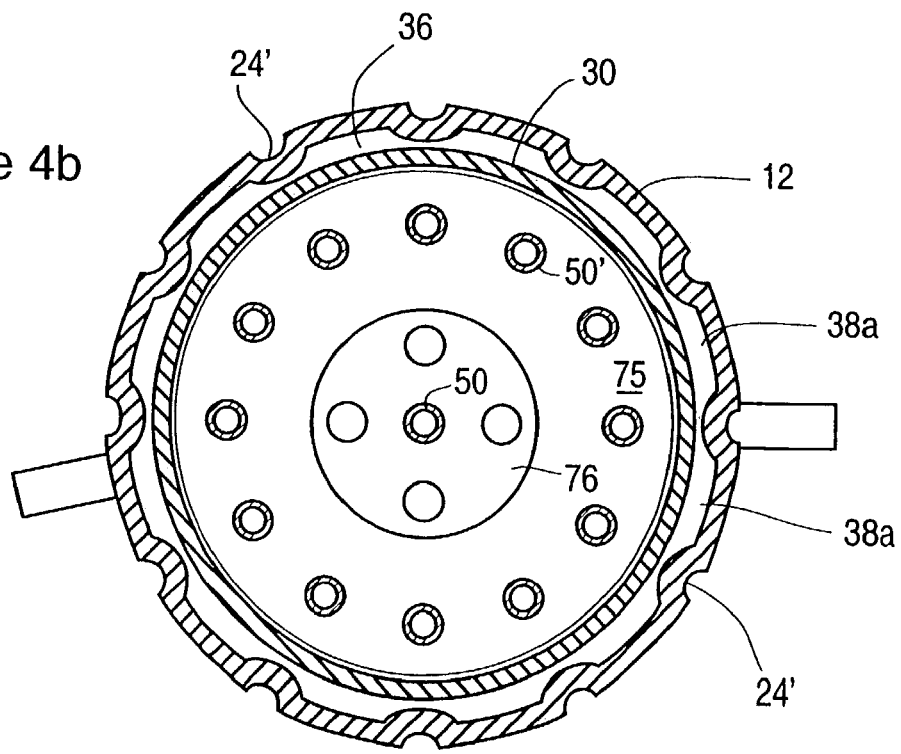

FIG. 4b illustrates an alternative to the use of corrugations 33. In FIG. 4b, the outer shell 12 is provided with inwardly extending ribs 24' of reduced height, such that the primary inner shell 30 is not in contact with some or all of the ribs 24' before the reformer 10 has reached operating temperature. As the reformer heats up and the inner shell expands outwardly, it preferably makes contact with at least some of the ribs 24', thereby centering the inner shell 30 within the outer shell 12 as in FIG. 4a. It will be appreciated that this type of arrangement could also be used in the type of reformer in which ribs 24 are replaced by dimples 25.

A first inlet 26 for the hydrogen-containing fuel is formed in the outer shell in the vicinity of the first end 14. It will be understood that this inlet is connected by a suitable hose or pipe (not shown) to a supply of hydrogen-containing fuel which can be any one of a variety of types suitable for hydrogen production. For example, the hydrogen-containing fuel may comprise a hydrocarbon fuel selected from one or more petroleum fractions such as gasoline, naphtha, kerosene, diesel fuel, etc.; natural gas or one or more components thereof, including methane, ethane, propane, etc. Alternatively, the hydrogen-containing fuel may comprise one or more alcohols such as methanol and ethanol. Preferred hydrocarbon fuels are gasoline and methane. The flow of fuel through the inlet 26 can be controlled by any suitable means, such as by a throttle or control valve, to meet the fuel cell engine load demand.

Extending into the outer shell is the primary inner shell 30 which has a primary end 32 and a secondary end 34. An outer surface 36 extends between the primary and secondary ends. It will be understood that the primary inner shell 30 is rigidly attached to the outer shell 12 at the first end 14 of the outer shell. The two shells can be attached at this location by welding or brazing. It will be seen that the inner shell 30 extends into the open first end 14 of the outer shell and projects a substantial distance into the outer shell. A fuel passageway 38 is formed between the outer surface 36 of the inner shell and the inner surface 18 of the outer shell and extends longitudinally from the inlet 26 to the secondary end 34 of the primary inner shell. When the aforementioned ribs

24 are formed on the outer shell, the fuel passageway 38 can comprise a plurality of separate sub-passageways 38a as illustrated in FIG. 4a. Since the ribs do not extend all of the way down to the level of the inlet 26, the bottom ends of these sub-passageways are interconnected to permit the fuel to flow completely about the inner shell and then upwardly through all of the sub-passageways. The location and shape of the ribs may be varied from that shown in FIG. 2. One skilled in the art will appreciate that the ribs or the dimples can be arranged so as to provide uniform flow distribution around the circumference of the shell to the maximum extent possible.

The preferred reformer 10 also has a secondary inner shell 40 which has a first end 42 located adjacent the secondary end 34 of the primary inner shell. The inner shell 40 also has a second end 44 spaced from the first end 42 and located away from the top or second end 16 of the outer shell. The preferred secondary inner shell 40 is also cylindrical like the inner shell 30 and it has the same external diameter. The secondary inner shell 40 can be substantially lower in height compared to the primary inner shell 30. At least one and preferably a plurality of outlet apertures 46 are formed between the primary inner shell 30 and the secondary inner shell 40 or in one of these two shells and are provided for passage of the gaseous fluid out of the primary inner shell.

As mentioned above, the gaseous fluid may preferably comprise a mixture of steam and air, with the relative concentrations of air and steam in the gaseous fluid preferably being adjustable by external means to permit the reformer to operate under a variety of conditions. For example, during start-up of the reformer, the gaseous fluid may be comprised entirely or primarily of air, resulting in catalytic combustion of the hydrogen-containing fuel and rapidly heating the reformer and the catalyst(s) to a predetermined temperature. Once the temperature reaches a sufficient level, the concentration of steam in the gaseous fluid is increased, thereby increasing the hydrogen output of the reformer.

The gaseous fluid enters the primary inner shell through a second inlet 48 provided in a side of the primary inner shell 30 in the vicinity of the primary end 32. It will be understood that the inlet 48 is connected by means of a suitable hose or pipe (not shown) to a source or supply providing the gaseous fluid. For example, a mixture of steam and air can be provided by a suitable boiler of standard construction. Though it is possible to extend the outer shell 12 downwardly from the position shown in FIGS. 1 and 2 so that it is adjacent the primary end 32 of the inner shell, it is preferable to terminate the outer shell just above the inlet 48. This simplifies the structure of the reformer and helps to reduce thermal stress. Also, by this construction, one avoids the need to pass the inlet 48 through the walls of two shells. It will be understood that the amount of the gaseous fluid delivered through the inlet 48 can be made proportional to the amount of fuel being delivered to the reformer, with means preferably being provided outside the reformer to control the composition of the gaseous fluid.

The illustrated apertures 46 of FIG. 2 are elongate in the circumferential direction but are relatively short in the axial direction. As will be seen hereinafter, the outlet apertures can become larger in size and can become interconnected as a result of longitudinal thermal expansion of heat exchange tubes 50 mounted in the reformer.

A further passageway 52 is formed between the secondary inner shell 40 and the outer shell 12 and extends from the first end 42 to the second end 44 of the secondary inner shell. Because the gaseous fluid flows out through outlets 46, it is mixed with the fuel just outside of the apertures and thus a mixture of the fuel and the gaseous fluid flows through the further passageway 52 during use of the reformer. It is also possible to consider the passageway 52 an extension of the passageway 38. As will be seen from FIG. 2, the ribs 24 can extend up to the location of the secondary inner shell 40 and thus the passageway 52 can also comprise a number of sub-passageways that extend vertically as seen in FIGS. 1 and 2. It will be seen that the ribs 24 (and the dimples 25 of the embodiment of FIGS. 12 and 13) function to properly center the two inner shells within the outer shell and hold the inner shells in the correct position and to strengthen the overall structure.

Figure 3:
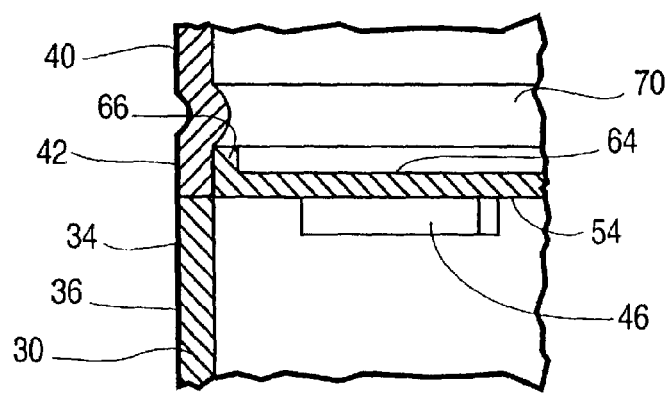
FIG. 3 is a cross-sectional detail taken along the line III—III of FIG. 2, this view showing the disconnected joint between the two inner shells.

As illustrated in FIG. 1 and more clearly shown in FIG. 3, the secondary end 34 of the primary inner shell and the first end 42 of the secondary inner shell preferably form a disconnected joint at 54. Because the two inner shells are not connected at this joint, the secondary inner shell 40 is free to move relative to the primary inner shell 30 upon longitudinal thermal expansion of the aforementioned heat exchange tubes 50. Thus, the structure according to the invention accommodates thermal expansion of the heat exchange tubes without increasing the gauge of the metal components and without resorting to the use of exotic materials. As well, the structure according to the invention is compact and provides for integrated preheating of the fuel and/or the gaseous fluid, thereby providing benefits in terms of improved energy efficiency. As well, the structure of the reactor is adaptable to formation of compact, integrated structures in which both fuel transformation and carbon monoxide cleanup reactions can be performed.

A first tube sheet 58 is fixedly mounted to the primary inner shell 30 in proximity to the primary end 32 and this sheet sealingly closes off the primary inner shell. This first tube sheet is preferably formed with a circumferential flange 60 for attachment and sealing purposes. Although the first tube sheet 58 is shown in the drawings as being circular, it will be appreciated that it may be of any suitable shape, for example oval, elliptical, rectangular, hexagonal, or any other multi-faceted shape, depending on the shape of the primary inner shell 30. The tube sheet is formed with a number of holes to receive the ends of an equal number of tubes 50 which can be rigidly attached to this tube sheet. The tubes 50 and the holes in tube sheet 58 are preferably, but not necessarily, circular. The tube sheet 58 can also be considered a bottom header of the reformer. The perimeter of the tube sheet can be attached to the inner surface of the inner shell 30 by any suitable known means including brazing and welding.

As shown in FIG. 1, the primary inner shell 30 may be formed with an inwardly extending circumferential "lip" 59, or other inwardly extending indentation(s), such as dimples, to correctly locate the first tube sheet 58 relative to the primary end 32 of the primary inner shell 30, and to form a bottom chamber to receive a catalyst 62. In the bottom chamber, a space sufficient in size is formed between the catalyst 62 and the first tube sheet 58 to ensure that the catalyst receives a uniform flow of reformate from tubes 50. In addition, a water or steam insertion or mixing device may be inserted into the space to provide water for the reaction taking place in catalyst 62. This is discussed more fully below in the context of FIG. 1.

The reformer also includes a second tube sheet 64 fixedly connected to the secondary inner shell 40 and sealingly closing the interior of the secondary inner shell. Again, the preferred tube sheet 64 has a circumferential flange 66 which can be brazed or welded to the inner surface of the inner shell 40 adjacent the first end 42. It will be understood that the second tube sheet also has a plurality of holes, preferably circular in shape, formed therein to receive the adjacent ends of the tubes 50 and this tube sheet can be rigidly connected to the ends of the tubes. In the illustrated preferred embodiment, the inner shell 40 is formed with a circumferential lip 70 that projects inwardly. This lip can help correctly locate the tube sheet 64 and it can also locate and support a first catalyst 72 for the fuel transformation reaction. As shown in FIG. 1, the first catalyst is preferably mounted within the secondary inner shell 40 and also within the outer shell 12 in the region of the second end 16. This catalyst 72 is preferably an autothermal reformation catalyst arranged for contact with the mixture of the fuel and the gaseous fluid comprising steam and air in order to produce the hot gaseous mixture.

A plurality of the aforementioned heat exchange tubes 50, only some of which are shown in FIG. 1 for ease of illustration, extend from the first tube sheet 58 to the second tube sheet 64. These heat exchange tubes form passageways for the aforementioned hot gaseous mixture to flow from the first catalyst 72 through the second tube sheet 64, then through the first tube sheet 58 and then to the catalyst 62, sometimes referred to hereinafter as the second catalyst.

The second catalyst 62 is preferably a suitable catalyst for use in a "carbon monoxide cleanup" which, as described above, comprises either a water/gas shift reactions (3) and/or a preferential oxidation reaction (4), as follows:

(3) Water/Gas Shift (Exothermic)

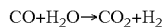

$CO+H_2O \rightarrow CO_2+H_2$ (4) Preferential Oxidation (Exothermic)

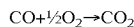

$CO+\frac{1}{2}O_2 \rightarrow CO_2$

Preferably, the second catalyst is a shift reaction catalyst, and more preferably a high temperature shift reaction catalyst. If a water/gas shift reaction is to be the second catalytic reaction then water or steam can be introduced into the fuel reformer at a point just below the tube sheet 58 and above the catalyst 62. This possibility is indicated in FIG. 1 by the short inlet pipe 190 shown in dashed lines and the arrow labeled W. Although not shown in FIG. 1, it will be appreciated that a mixing device will preferably be received inside the bottom chamber between the tube sheet 58 and catalyst 62. The mixing device is attached to the end of water inlet pipe 190 and ensures even distribution of the injected water or steam within the reformate for reaction in the catalyst 62. The mixing device effectively shortens the length of the space between tube sheet 58 and catalyst 62 which would otherwise be required to achieve reasonable flow mixing and distribution of the injected steam or water.

The primary inner shell 30 is preferably open at its primary end 32 as illustrated so as to allow outflow of the reformate. Alternatively, a smaller outlet opening for the reformate can be formed at the bottom end 32 of the inner shell and this outlet can be connected to one or more reactors in which the amount of carbon monoxide in the reformate is further reduced to an acceptable level, which may be less than 50 ppm depending on the type of fuel cell being utilized. Where, for example, the carbon monoxide cleanup reaction conducted with the second catalyst 62 comprises a high temperature shift reaction, the reformate may preferably be subjected to one or more additional shift reactions downstream of the reformer 10, including at least one low temperature shift reaction, and/or the reformate may be subjected to preferential oxidation downstream of the reformer 10. After removal of carbon monoxide, the resulting hydrogen gas product can be piped to a fuel cell, if desired.

The catalyst material 62 or 72 can be supported on various types of structures. The support structure may comprise one or more corrosion and heat resistant materials such as ceramics or refractory materials, and is in a form which promotes contact between the flowing gases and the catalyst material within the reformer. Examples of support materials include magnesia, alumina, silica and zirconia, and mixtures thereof, and the support structure may be in the form of beads or grids, for example extruded ceramic monolith grids. In the alternative, the catalyst support or the catalyst itself may comprise a corrugated, rolled metal foil which is mechanically assembled into the inner shell section. The corrugated foil may, for example, be in the form of a slit and convoluted shape, such as a turbulizer. Where a metal foil is used, it is mounted in a manner known per se, so that it will not vibrate but which allows thermal expansion under the high temperature operating conditions of the catalyst. In an alternative arrangement, some or all of the first catalyst may be contained inside heat exchange tubes 50, for example the catalyst material may be supported on the inner surfaces of the tubes 50 and/or on turbulizers contained within the tubes 50. Regardless of the form of the catalyst material or the support structure, the catalyst material is arranged so as not to unduly restrict the flow of the fuel/gas mixture through the reformer. This arrangement of the catalysts (and as illustrated) allows the reformer to be quite compact and reduces the overall length requirements substantially.

Preferably there are mounted on the tubes 50 a number of baffle plates such as illustrated baffle plates 75, 76, 77. As shown in FIGS. 1, 4a, 4b and 5, the edges of these plates are preferably in close proximity to, but not connected to the inner shell, and are rigidly connected to at least one and preferably a plurality of the tubes. One reason for connecting the baffle plates to the tubes is to make the assembly process easier. The baffle plates are preferably not connected to the inner shell so that the tubes 50 may expand longitudinally relative to the inner shell.

The plates 75, 76, 77 are formed with openings, preferably circular in shape, through which the tubes 50 extend. The lowermost baffle plate 75 is annular and has a large central opening 80 formed therein. The outermost tubes 50' extend through the plate 75 near their bottom ends. The uppermost baffle plate 77 is also annular and has a large central opening 82, with the outermost tubes 50' extending through plate 77 near their top ends. The diameters of the uppermost baffle plate 77 and lowermost plate 75 are preferably such that there is no substantial flow of gases through the gap between the edges of plates 75, 77 and the primary inner shell 30. The gap preferably does not exceed 1 mm. It will be appreciated that the gap between plates 75, 77 and the primary inner shell 30 is exaggerated in the drawings.

Baffle plate 76 is located between the bottom baffle plate 75 and the top baffle plate 77 and a number of centrally located tubes 50 can extend through this plate although only one is shown in FIG. 1. In contrast to the lowermost and uppermost baffle plates 75, 77, plate 76 does not have a large central opening for passage of gases. Instead, plate 76 has a diameter such that a relatively large gap exists between the edges of plate 76 and the primary inner shell 30, thereby encouraging flow of gases around the edges of plate 76. In this way, the baffle plates 75, 76, 77 act to force the upflowing gaseous fluid to flow in a sinuous or winding manner to enhance the heat exchange process, and to establish a good annular flow distribution for ejection through the outlet openings 46. As shown by the curved arrows passing through the central opening 82 of top baffle plate 77 in FIG. 1, the gaseous fluid passing through the top baffle plate 77 flows radially outwardly toward outlet openings 46. As it passes through the openings 46, the gaseous fluid is uniformly mixed with the axially flowing hydrogen-containing fuel, in preparation for good radial flow distribution of the mixed fluids prior to entering catalyst bed 72.

It will be appreciated that there may be more than three baffle plates in the heat exchanger, and that the baffle plates do not necessarily have a circular or annular shape as shown in the drawings. Rather, the plates can have any configuration which will enhance the heat exchange process while maintaining adequate flow distribution.

It will be understood that the upward flowing steam and air is heated by the downward flowing reformate passing through the tubes 50. As a result of this exchange, the reformate is cooled as it passes downwardly through the tubes. Since the temperature of the reformate is much higher than the mixture of steam and air, the thermal expansion of the tubes is much longer than the expansion of the inner shell 30. However, because the secondary inner shell 40 is free to move relative to the primary inner shell 30, the greater expansion of the tubes 50 is accommodated and thus there is no build up of thermal stress which could otherwise break the joint between the tubes and one or both of the headers or the joint between the headers and the inner shell. It will also be seen that because of the thermal expansion of the tubes, the outlet apertures 46 vary in size during operation of the fuel reformer and these outlet apertures in fact become larger as the length of the tubes 50 increases, thereby reducing the aperture flow resistance to effect either a sustained or increased flow of gaseous fluid out of the primary inner shell. This has the advantage of allowing a faster reforming process as the reformer achieves optimum operating temperatures. It should be noted that the gases flowing through the reformer are less dense as their temperature rises and the increased aperture size may partly compensate for this.

It will be understood that in the preferred, illustrated fuel reformer, there is a hydrogen-containing fuel mixture delivery arrangement which is adapted to deliver a mixture of the hydrogen-containing fuel and the gaseous fluid (comprising steam and air) to the first catalyst 72. Although this hydrogen-containing fuel mixture delivery arrangement can take various forms, in the preferred illustrated embodiment of FIGS. 1 and 2, this arrangement comprises the aforementioned outer shell member 12 that extends around the primary and secondary shell members and is rigidly connected to the primary shell member. It will be appreciated, for example, that the incoming hydrogen-containing fuel can be heated by means other than that illustrated in FIGS. 1 and 2, for example by means of heat exchange with the hot mixture of steam and air passing through the heat exchanging chamber 100. In another alternative construction shown in FIG. 5, the fuel could simply be introduced directly into the upper chamber 102 where it can mix with the hot mixture of steam and air passing out of the outlet apertures 46. The upper chamber 102 can be considered an enclosed mixing chamber that is adjacent the first catalyst 72. Although the fuel is not preheated inside the reformer of FIG. 5, it may be preheated elsewhere in the system. The fuel reformer shown in FIG. 5 may be the preferred configuration in terms of safety since the fuel and the oxygen-containing gas are combined immediately before they reach the catalyst 72.

The combination of the secondary inner shell 40 and the second tube sheet 64 can be considered a second tube sheet device which is separate from the primary shell member 30 and which is located in the vicinity of the secondary end 34. This second tube sheet device forms one end of the heat exchanging chamber 100. As illustrated, one end of the second tube sheet device which includes the secondary shell member 40 is located adjacent the secondary end 34 of the primary shell member.

If desired, a turbulizer, which per se is of known construction, can be inserted into the passageway 52 in order to ensure a very good mixing of the fuel and the steam and air. It will be understood that this turbulizer is annular in shape and extends about the circumference of the secondary inner shell 40.

The sheet metal from which these fuel reformers are made must have a sufficiently high melting point, elevated temperature strength, and oxidation resistance in order to achieve the necessary durability. Typical materials that can be used to construct this reformer include austenitic or ferritic stainless steel, Inconel (™), and other nickel or alloy steel materials. The gauge of the sheet metal will depend on the design of the particular reformer system but can typically range from 0.5 mm to 4 mm for low to moderate life requirements, or the gauge can be doubled over this range for large or extended life applications (for example, stationary power). The size of the fuel reformer of this invention can vary depending upon its intended use, it being understood that it is generally desirable to reduce the weight and space requirements of the reformer while maintaining the desired durablility.

For purposes of initial start-up of the illustrated fuel reformer, a separate vaporizer (not shown) can be used to heat and vaporize the fuel such as gasoline so that the initial exothermic autothermal reformation can commence. Once this reaction commences, because of the heat created by the autothermal reformation process, the temperature of the system at the catalyst 72 will increase quickly.

It may also be possible to use the gaseous fluid exiting the chamber 100 to heat up the small amount of fuel that is used initially and thereby achieve a mixture temperature which is sufficiently high to start or facilitate the start of the autothermal reformation reaction. If desired, a catalytic or non-catalytic burner can be used to heat the gaseous fluid, at least for purposes of a cold start-up of the reformer.

Figure 5:
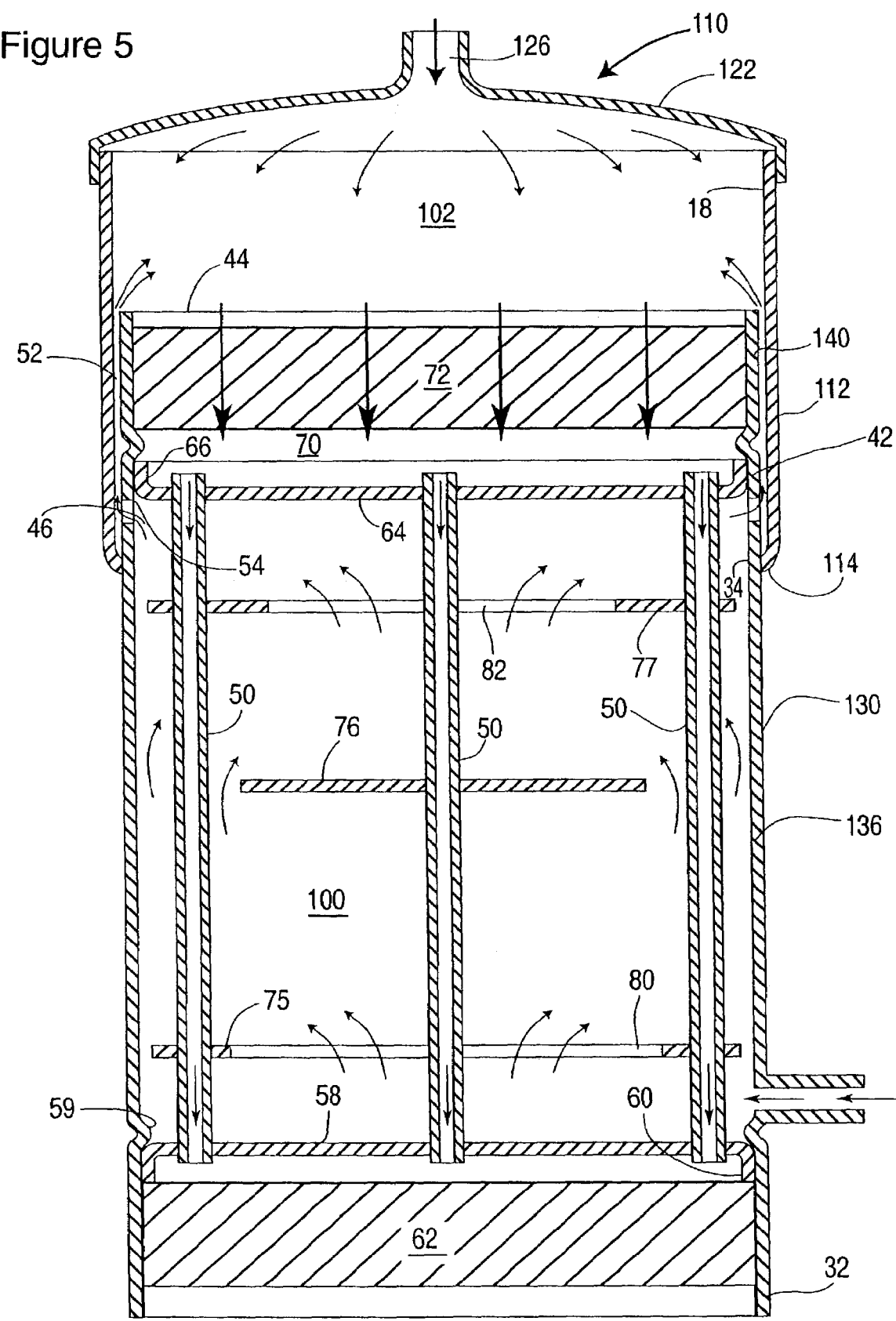
FIG. 5 is an axial cross-section of an alternate embodiment of a fuel conversion reactor, comprising a fuel reformer wherein the fuel is not preheated by the reformer itself.

The alternate fuel reformer 110 shown in FIG. 5 also differs from fuel reformer 10 in that the outer shell 112 is substantially shorter than the outer shell 12 in reformer 10. The outer shell 112 terminates at a first or bottom end 114 which can be just below the apertures 46. The outer shell is closed by means of a top cap member 122 which, unlike the cap member in the first embodiment, is formed with a central inlet 126 for the flow of hydrogen-containing fuel into the reformer. As already discussed above, the fuel therefore flows directly into the upper chamber 102 where it is mixed with the gaseous fluid immediately before passing through the first catalyst 72. For some applications, the fuel can enter the chamber 102 unheated or the fuel can be preheated elsewhere by suitable known heating means (not shown). Extending into the outer shell 112 is a primary shell 130 which can be similar in its construction to the primary inner shell 30 of the first embodiment. The shell 130 has an outer surface 136 which extends between the primary end 32 and the secondary end 34. The primary shell 130 is rigidly attached to the outer shell 112 at the first end 114 by means of welding or brazing. In this embodiment the primary shell 130 extends only a short distance into the outer shell. The fuel reformer 110 also has a secondary shell 140 which is located within the outer shell 112. This secondary shell can be similar in its construction to the secondary shell 40 of the first embodiment. There is a passageway 52 formed between the secondary shell 140 and the outer shell 112 and in a preferred embodiment it is a mixture of steam and air which passes upwards through this passageway to the mixing chamber 102. In this embodiment there is also a disconnected joint at 54 formed between the secondary end 34 of the primary shell 130 and the first or bottom end 42 of the secondary shell 140.

Figure 6:
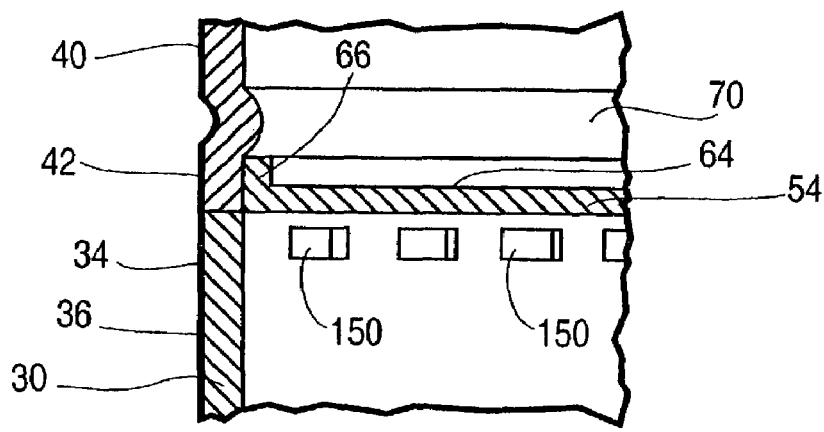
FIG. 6 is a cross-sectional detail similar to FIG. 3 but showing another form of outlet apertures formed in the primary inner shell.

It will be appreciated by those skilled in this art that the outlet apertures formed in the region where the primary inner shell 30 meets the secondary inner shell 40 can be provided in various forms and some of these alternatives are illustrated in FIGS. 6 to 10 of the drawings. As illustrated in FIG. 6, a plurality of outlet apertures 150 can be formed in the primary inner shell 30 a short distance below the secondary end 34. These apertures can be rectangular as shown or they can be other shapes such as circular or elliptical. Preferably these apertures are distributed evenly about the circumference of the inner shell 30 and preferably the outlet apertures are all of similar or identical size. It will be understood that a butt joint or disconnected joint 54 is still provided in this embodiment, and may be used alone or in conjunction with additional apertures as shown in FIGS. 6 to 10.

Figure 7:
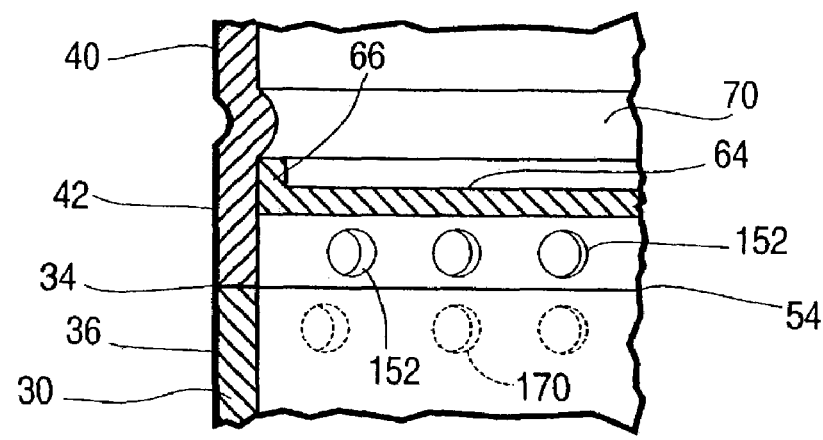
FIG. 7 is a cross-sectional detail similar to FIG. 3 but showing an alternate embodiment wherein outlet apertures are formed in a secondary inner shell.

In the alternative embodiment illustrated in FIG. 7, a plurality of outlet apertures 152 are formed about the circumference of the secondary inner shell 40 and are spaced a short distance from its first end 42. The illustrated apertures are circular but again other shapes are also possible such as square, rectangular and elliptical. The apertures 152 are preferably distributed evenly about the circumference of the secondary inner shell. There may or may not be outlet apertures 170 formed in the primary inner shell 30. Again, there is a butt or disconnected joint provided at 54.

Figure 8:
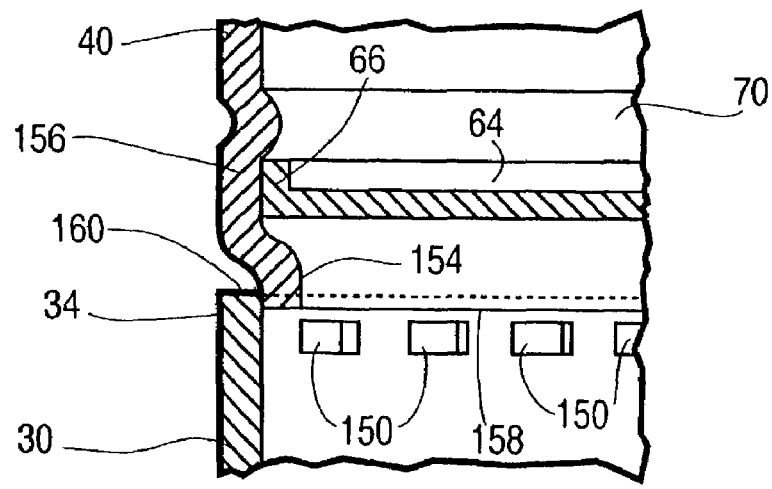
FIG. 8 is a cross-sectional detail similar to FIG. 3 but showing a further embodiment wherein outlet apertures are formed in the primary inner shell and the secondary inner shell is formed with a sleeve extension.
Figure 9:
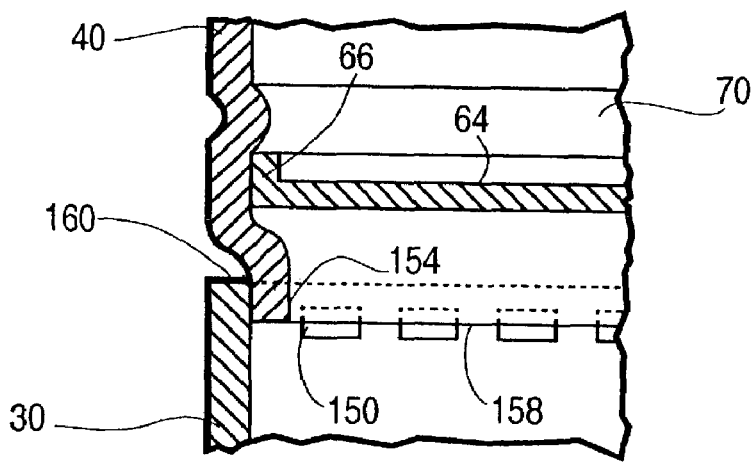
FIG. 9 is another cross-sectional detail of the embodiment of FIG. 8 but showing the two inner shells in a different or initial position.

Turning to the embodiment illustrated by FIGS. 8 and 9, this embodiment is similar to that illustrated in FIG. 6 in that the primary inner shell 30 is formed with a plurality of rectangular outlet apertures 150 located a short distance from the secondary end 34. However, in this embodiment, the upper or secondary inner shell 40 is formed with a short sleeve extension 154. This sleeve extension extends about the circumference of the inner shell 40 at the end adjacent to the secondary end 34 of the primary inner shell. The sleeve extension 154 is coaxial with a main peripheral side wall 156 of the inner shell 40. It will be understood that the peripheral side wall 156 has a first predetermined diameter while the sleeve extension 154 has a second predetermined diameter which is different from the first predetermined diameter and is in fact less than the first predetermined diameter in the embodiment illustrated in FIGS. 8 and 9. The sleeve extension 154 has a free end 158 located in the region of the outlet apertures 150. It will be understood that, as in the above described embodiments, the secondary shell member 40 is relatively movable during use of the fuel reformer between a first or initial position illustrated in FIG. 9 and a second position illustrated in FIG. 8. As shown in these figures, in the first position, the apertures 150 are partially blocked by the sleeve extension 154. However, as the fuel reformer heats up and the tube bundle expands, the inner shell 40 moves a short distance away from the primary inner shell 30 and thus, as shown in FIG. 8, the apertures 150 are at least substantially or entirely open for passage of the gaseous fluid out of the shell 30. In this embodiment, there is still a disconnected joint 160 but this joint is now formed between the secondary end 34 of the inner shell 30 and the adjacent end of the peripheral sidewall 156. In this embodiment, the external diameter of the sleeve extension 154 is only slightly smaller than the internal diameter of the inner shell 30.

Figure 10:
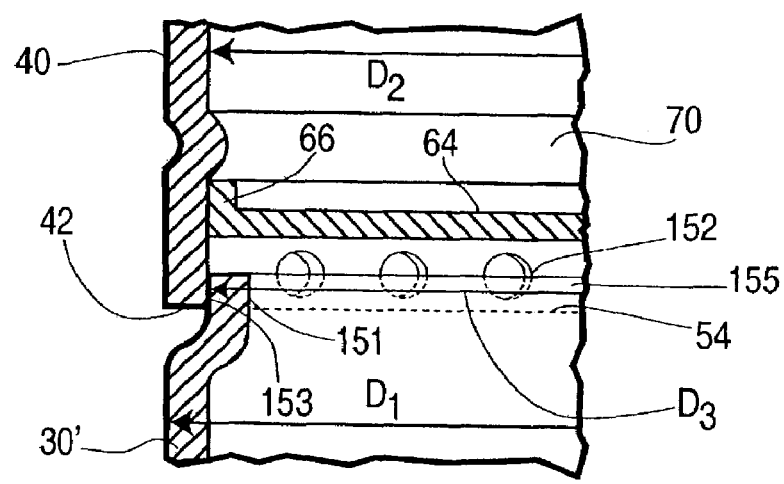
FIG. 10 is a further cross-sectional detail similar to FIG. 3 but showing another embodiment wherein outlet apertures are formed in the secondary inner shell and the primary inner shell is formed with a sleeve extension.

Turning to the variation shown in FIG. 10, this embodiment is similar to that shown in FIG. 7 in that the outlet apertures 152 are formed about the circumference of the secondary inner shell 40 and are spaced a short distance from its first end 42. The primary inner shell 30' is formed with a coaxial sleeve extension 151 connected to its sidewall at the shell's secondary end 34. It will be seen that the primary inner shell 30' has an external diameter $D_1$ while the secondary inner shell has an internal diameter $D_2$. The sleeve extension 151 has an external diameter $D_3$ as measured to exterior surface 153 which is different from the external diameter $D_1$ of primary inner shell 30' and different from the internal diameter $D_2$ of the secondary inner shell 40. In the preferred embodiment of FIG. 10, diameter $D_3$ is less than both diameters $D_1$ and $D_2$. The sleeve extension 151 has a free end 155 located in the region of the outlet apertures 152. As shown in FIG. 10, these apertures are partially blocked by the sleeve extension 151, but as the fuel reformer heats up, these apertures are less blocked or entirely open for passage of gaseous fluid.

It will be appreciated that variations of these alternative constructions are possible. For example, instead of the sleeve extension 154 of FIG. 9 or sleeve extension 151 of FIG. 10 being received inside the opposing inner shell, it is possible to construct the sleeve extension 151 or 154 to have an internal diameter larger than the external diameter of the opposing inner shell, so that the end of the opposing shell is received inside the sleeve extension 151 or 154. Although alternative constructions are possible for the outlet apertures, generally these outlet apertures will be located or positioned adjacent to the butt or disconnected joint 54, 160.

Figure 11:
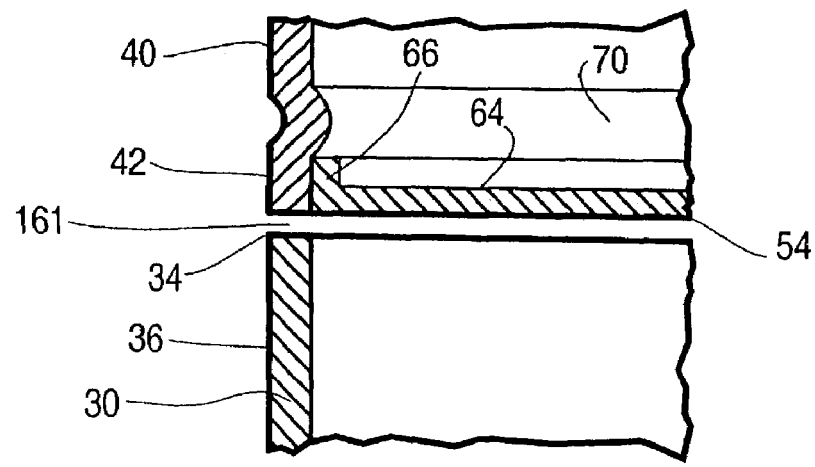
FIG. 11 is a further cross-sectional detail similar to FIG. 3 but showing another embodiment wherein a single, continuous outlet aperture is formed between the primary and secondary inner shells.

As shown in FIG. 11, it is also possible to construct the reformer such that a single, continuous aperture 161 exists between the primary and secondary inner shells. In such a construction, the tubes 50 are of sufficient length to create the aperture 161 between the primary and secondary inner shells, the gap 161 expanding in response to longitudinal expansion of the tubes 50.

Figure 14:
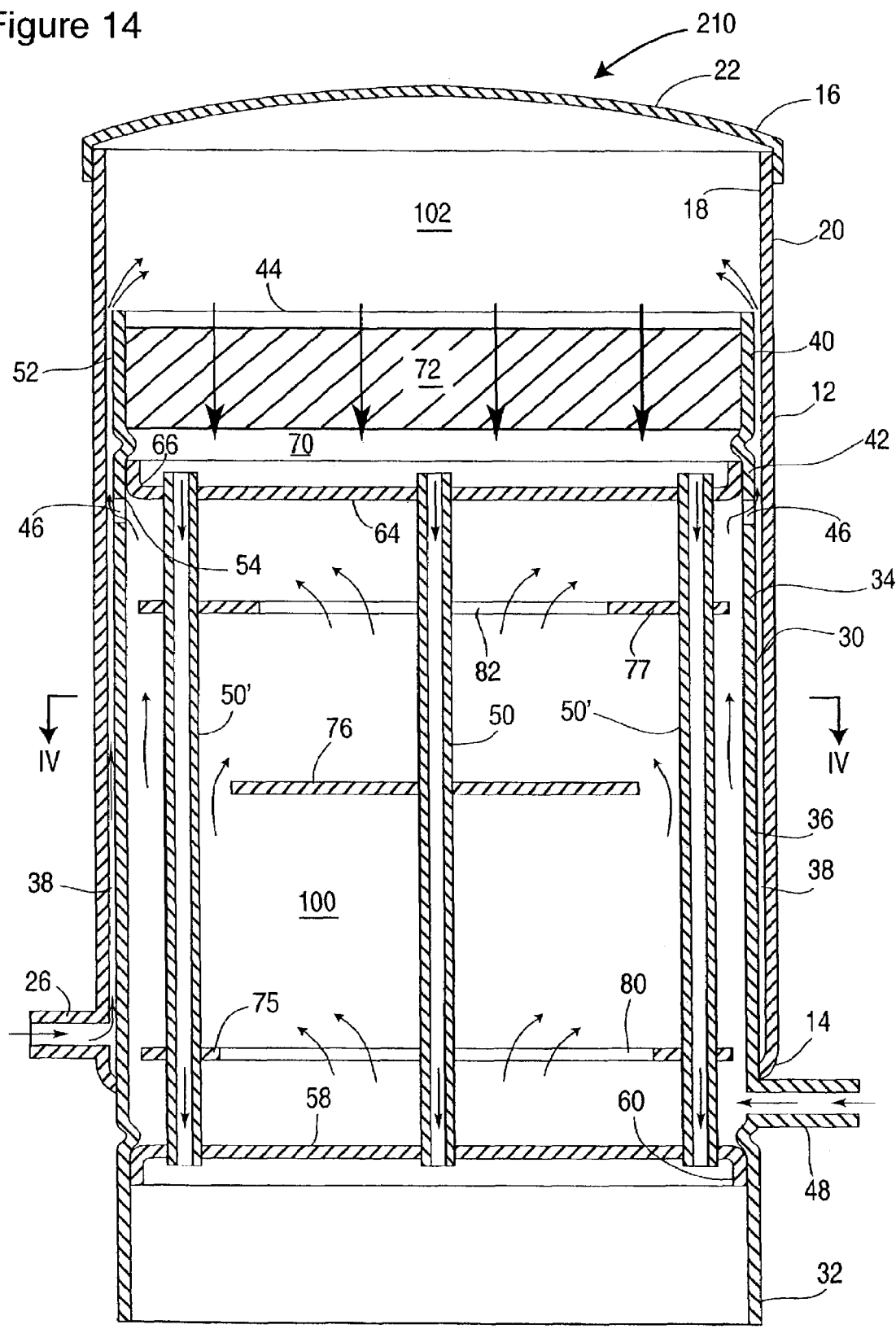
FIG. 14 is an axial cross-section of a further alternate embodiment of a fuel conversion reactor, comprising a fuel reformer wherein the second catalyst bed is eliminated.

It will be appreciated by those skilled in the art of fuel reforming that it is possible to construct a fuel reformer in accordance with this invention wherein one of the catalysts is omitted entirely and the reformer contains only the first catalyst 72 or the second catalyst 62. An example of such a fuel reformer 210 is illustrated in FIG. 14. Most of the components of fuel reformer 210 are identical to the components described above in connection with preferred fuel reformer 10, and are identified by identical reference numbers. Fuel reformer 210 differs from fuel reformer 10 in that the second catalyst 62 is omitted from fuel reformer 210. The preferred fuel reformer 210 may be utilized, for example, where it is desired to perform all the carbon monoxide cleanup reactions downstream of the reformer 210.

Although the preferred embodiment shown in FIG. 14 is suitable for use as a fuel reformer, it may instead be used as a catalytic burner to generate heat for use elsewhere in the fuel cell system, for example to heat steam for a fuel transformation reaction. The heat generated by the burner is preferably recovered downstream of the burner. In such an embodiment, the hydrogen-containing fuel may preferably be comprised partially or entirely of a fuel cell anode off-gas, which is reacted catalytically with an oxygen-containing gaseous fluid to generate hot combustion gases. Some of the heat contained in the combustion gases is transferred to the incoming fuel and gaseous fluid, and additional heat is preferably recovered by one or more heat exchangers which can either be discretely separate units or which can be integrated with the burner. As mentioned earlier, the other preferred fuel reformers described herein may also be similarly converted to catalytic burners.

As mentioned earlier, the preferred fuel reformers described herein can also be converted to non-catalytic burners by omitting both catalysts from the reformer structure. In a non-catalytic burner according to the invention, a hydrogen-containing fuel as in the catalytic burner described above is combusted with an oxygen-containing gaseous fluid in the upper chamber (for example chamber 102 of FIG. 1) of the burner. The hot combustion gases are then partially cooled by the incoming fuel and gaseous fluid as they pass through the tubes 50. The partially cooled combustion gases then exit the burner, where they are preferably further cooled by one or more additional heat exchangers which can either be discretely separate units or which can be integrated with the burner.

Figure 15:
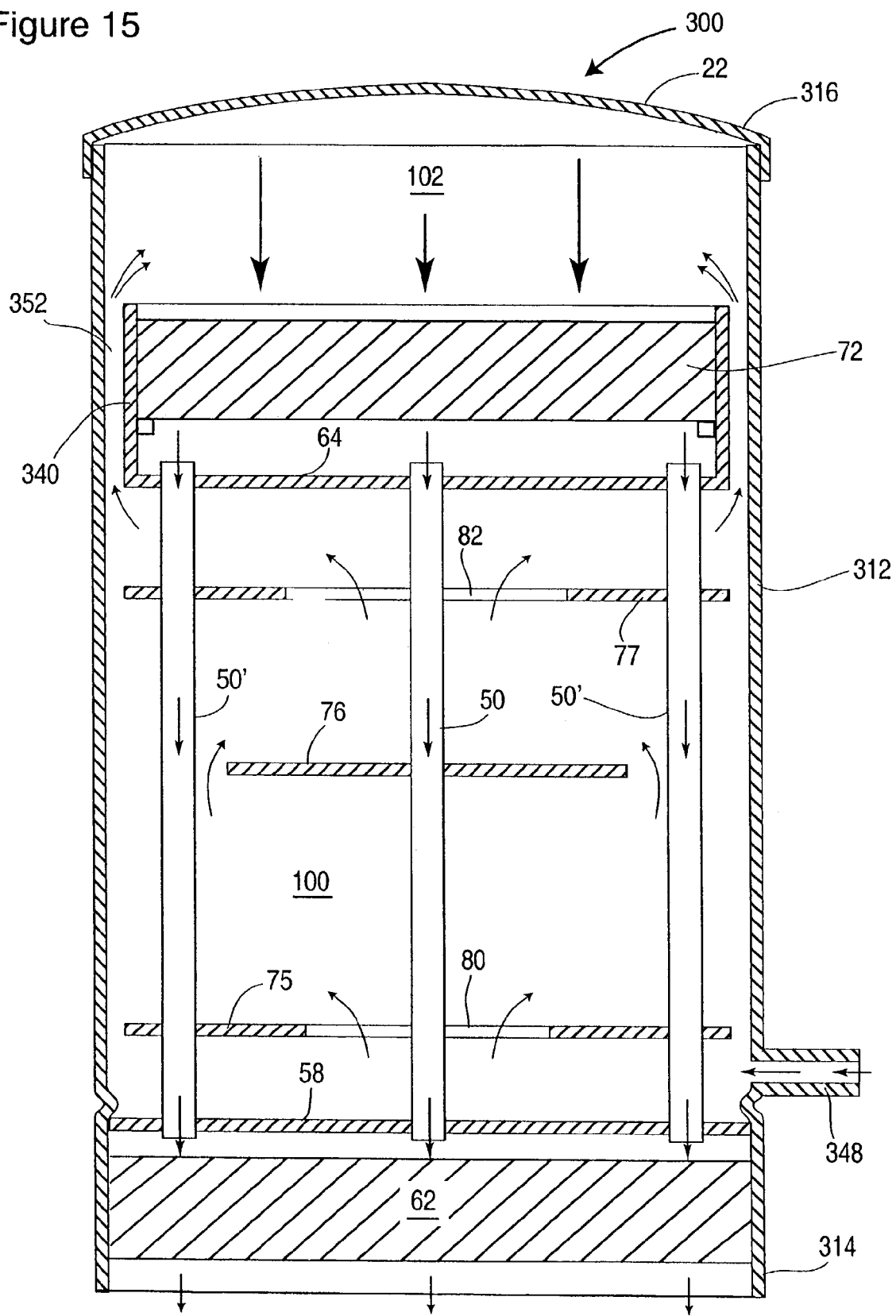
FIG. 15 is an axial cross-section of a single shell fuel conversion reactor according to a further alternate embodiment of the present invention.

FIG. 15 illustrates another preferred fuel reformer 300 according to the present invention which is also particularly useful as a catalytic or non-catalytic burner, as described above. Most of the components of fuel reformer 300 are identical to the components described above in connection with preferred fuel reformer 10, and are identified by identical reference numbers. Fuel reformer 300 differs primarily from that shown in FIG. 1 in that it is of a single shell design, having an outer shell 312 extending between a first end 314 and a second end 316 of the reformer 300. The reformer 300 has a single inlet through which both a hydrogen containing fuel and a gaseous fluid may be introduced into the heat exchanging chamber 100. Alternatively, the hydrogen-containing fuel and the gaseous fluid may be introduced through separate inlets (not shown), including a configuration as in FIG. 5 where the fuel is introduced through the top cap member 22.

In reformer 300, the hydrogen-containing fuel and the gaseous fluid are mixed inside the heat exchanging chamber 100, flowing around and through baffle plates 75, 76 and 77 and into annular passage 352 which connects the heat exchange chamber 100 to the upper chamber 102. The mixed fuel and gaseous fluid are reacted as they flow through catalyst 72 to produce hydrogen and carbon monoxide, preferably by an autothermal reformation. The hot reformate flows through tubes 50 and transfers some of its heat to the fuel and gaseous fluid flowing through the heat exchange chamber 100.

The annular passage 352 is formed between outer shell 312 and inner shell 340 which is secured to second tube sheet 64. Thermal stresses are prevented by the lack of a secured connection between the inner shell 340 and outer shell 312, thereby forming a disconnected joint whereby axial expansion of the tubes results in relative axial movement of the inner shell 340 relative to the outer shell 312.

Although reformer 300 is shown as comprising a reformer having two catalysts 72 and 62, it will be appreciated that reformer 300 may also be used as a fuel reformer having a single catalyst, or may be used as a catalytic or non-catalytic burner, as described above. It will also be appreciated that reformer 300 may be provided with ribs 24, dimples 25 or the like to centre the inner shell 340 within the outer shell 312, in the manner described above with reference to the other preferred embodiments.

Figure 16:
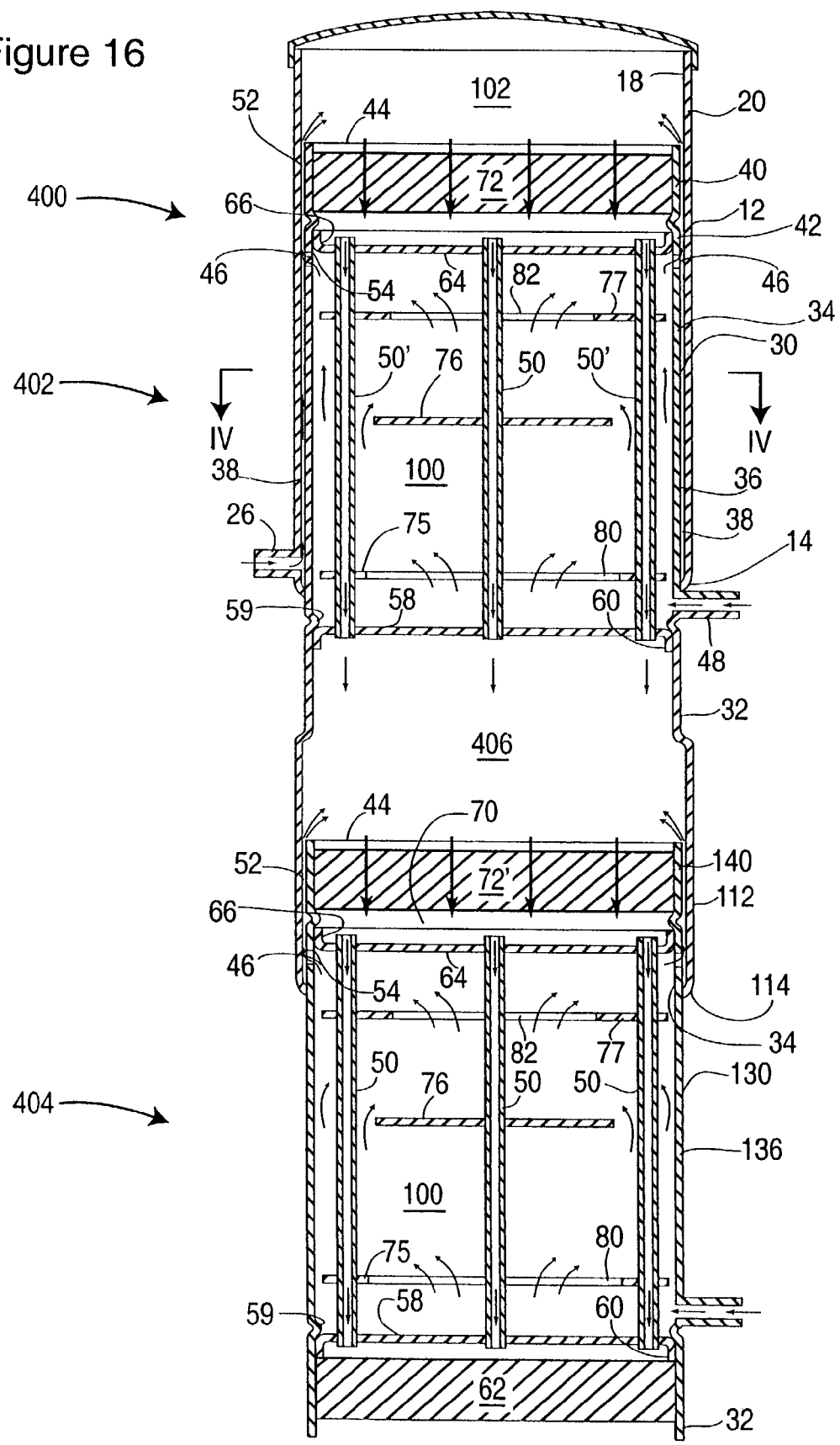
FIG. 16 is an axial cross-section of an integrated fuel conversion reactor according to the present invention.

Also included within the scope of the present invention are integrated fuel conversion reactors in which two or more individual reactors according to the invention are joined end-to-end to form integrated structures. The integrated structures may preferably be formed by welding or brazing the outer shells of the individual reactors. FIG. 16 illustrates one preferred form of integrated reactor, comprising a fuel reformer 400 in which a reactor 402 similar to that shown in FIG. 1 and having a single catalyst 72 is coupled end-to-end with a reactor similar to that shown in FIG. 5 and having a pair of catalysts 72' and 62. In a particularly preferred embodiment, the catalyst 72 of reactor 402 comprises a fuel transformation catalyst for converting a hydrogen-containing fuel to hydrogen, preferably an autothermal reformation catalyst. The catalysts 72' and 62 of reactor 404 may preferably comprise high and low temperature shift reaction catalysts, respectively. In this reactor 400, the hot reformate produced in catalyst 72 flows through tubes 50 of reactor 402 and into a mixing chamber 406 where it is combined with steam preheated in heat exchange chamber 100 of reactor 404. The carbon-monoxide depleted reformate flows from catalyst 72' through tubes 50 of reactor 404 where it is cooled by heat exchange with the steam in chamber 100, before entering catalyst 62 for the low temperature shift reaction. Similarly, it is possible to provide an integrated system which includes a preferential oxidation catalyst It will be appreciated by those skilled in the art of fuel reformers that various modifications and changes can be made to the illustrated and described fuel reformer without departing from the spirit and scope of this invention. Accordingly, all such modifications and changes as fall within the scope of the appended claims are intended to be included within the scope of this invention.

What is claimed is:

1. A fuel conversion reactor comprising a shell-and-tube heat exchanger for heating a gaseous fluid prior to reaction with a fuel and for cooling a gaseous mixture produced by the reaction, said heat exchanger comprising:
   a primary shell member having primary and secondary ends and a sidewall extending between said ends and defining a heat exchanging chamber located within the shell member;
   an inlet for introducing said gaseous fluid into said heat exchanging chamber;
   a first tube sheet fixedly mounted on said primary shell member in the vicinity of said primary end and sealingly closing said heat exchanging chamber at one end of the chamber;
   a second tube sheet device which is separate from said primary shell member and is located in the vicinity of said secondary end, said second tube sheet device forming another end of said chamber that is opposite said one end of the chamber; and
   a plurality of heat exchange tubes extending from said first tube sheet to said second tube sheet device and rigidly connected to both the first tube sheet and the second tube sheet device, said heat exchange tubes providing passageways for said gaseous mixture to flow inside the tubes through said heat exchanging chamber;
   wherein one or more outlet apertures are formed in the region of said secondary end of said primary shell member in order to provide at least one outlet for said gaseous fluid which flows through said heat exchanging chamber on a shell-side thereof during operation of said fuel conversion reactor;
   wherein said second tube sheet device includes a secondary shell member having a peripheral sidewall, a first end located adjacent to said secondary end of the primary shell member and a second end spaced from the first end;

wherein the secondary shell member and the secondary end of the primary shell member together form a disconnected joint; and wherein said second tube sheet device is free to move relative to said primary shell member upon thermal expansion of said heat exchange tubes.

2. A fuel conversion reactor according to claim 1, wherein said one or more outlet apertures are formed in at least one of said primary shell member and said second tube sheet device.

3. A fuel conversion reactor according to claim 1, wherein said one or more outlet apertures are formed between said primary shell member and said second tube sheet device.

4. A fuel conversion reactor according to claim 1 including an outer shell having first and second ends and an outer shell wall extending between said first and second ends, said outer shell being closed at said second end, extending around said primary shell member and said second tube sheet device, and having an inlet for said fuel, wherein a fuel passageway is formed between said outer shell wall and said sidewall of the primary shell member and extends from said inlet for the fuel to said one or more outlet apertures.

5. A fuel conversion reactor according to claim 1 wherein a gap is formed at said disconnected joint.

6. A fuel conversion reactor according to claim 5, wherein said one or more outlet apertures comprises said gap.

7. A fuel conversion reactor comprising a shell-and-tube heat exchanger for heating a gaseous fluid prior to reaction with a fuel and for cooling a gaseous mixture produced by the reaction, said heat exchanger comprising:

a primary shell member having primary and secondary ends and a sidewall extending between said ends and defining a heat exchanging chamber located within the shell member;

an inlet for introducing said gaseous fluid into said heat exchanging chamber;

a first tube sheet fixedly mounted on said primary shell member in the vicinity of said primary end and sealingly closing said heat exchanging chamber at one end of the chamber;

a second tube sheet device which is separate from said primary shell member and is located in the vicinity of said secondary end, said second tube sheet device forming another end of said chamber that is opposite said one end of the chamber; and a plurality of heat exchange tubes extending from said first tube sheet to said second tube sheet device and rigidly connected to both the first tube sheet and the second tube sheet device, said heat exchange tubes providing passageways for said gaseous mixture to flow inside the tubes through said heat exchanging chamber;

wherein one or more outlet apertures are formed in the region of said secondary end of said primary shell member in order to provide at least one outlet for said gaseous fluid which flows through said heat exchanging chamber on a shell-side thereof during operation of said fuel conversion reactor;

further comprising a first catalyst to catalyze the reaction of the fuel and the gaseous fluid, said catalyst being mounted in a secondary shell member having a peripheral sidewall, with an end of said peripheral sidewall being located adjacent said secondary end of the primary shell member and, together with said secondary end, forming a disconnected joint, said catalyst being arranged for flow of a mixture of said fuel and said gaseous fluid therethrough to produce said gaseous mixture.

8. A fuel conversion reactor according to claim 7, wherein the first catalyst comprises an autothermal reformation catalyst.

9. A fuel conversion reactor according to claim 7, wherein the first catalyst comprises a partial oxidation catalyst.

10. A fuel conversion reactor according to claim 7, wherein the first catalyst comprises a steam reformation catalyst.

11. A fuel conversion reactor according to claim 7, wherein the first catalyst comprises a combustion catalyst.

12. A fuel conversion reactor according to claim 7, further comprising a second catalyst arranged in said primary shell member in the vicinity of said primary end and outside said heat exchanging chamber.

13. A fuel conversion reactor according to claim 12, wherein the second catalyst is a water/gas shift reaction catalyst.

14. A fuel conversion reactor according to claim 12, wherein the second catalyst is a preferential oxidation catalyst.

15. A fuel conversion reactor according to claim 1, wherein said one or more outlet apertures are formed at said secondary end of said primary shell member.

16. A fuel conversion reactor according to claim 1, wherein said second tube sheet device includes a secondary shell member having a peripheral sidewall with a first predetermined diameter and a coaxial sleeve extension extending from said peripheral sidewall at an end thereof closest to said secondary end and having a second predetermined diameter different than said first predetermined diameter, wherein said sleeve extension has a free end located in the region of said one or more outlet apertures which are formed at or near said secondary end of said primary shell member, and wherein said secondary shell member is relatively movable during use of said fuel conversion reactor between a first position wherein said one or more apertures are partially blocked by said sleeve extension and a second position where said one or more apertures are at least substantially open for passage of said gaseous fluid.

17. A fuel conversion reactor according to claim 1, wherein said second tube sheet device includes a secondary shell member having a peripheral sidewall with a first internal diameter, said primary shell member has a primary external diameter and a coaxial sleeve extension extending from its sidewall at its secondary end, said sleeve extension having an external diameter different from said primary external diameter and different from said first internal diameter and having a free end located in the region of said one or more outlet apertures which are formed around said second tube sheet device, and wherein said secondary shell member is relatively movable during use of said fuel conversion reactor between a first position wherein said one or more apertures are partially blocked by said sleeve extension and a second position where said one or more apertures are at least substantially open for passage of said gaseous fluid.

18. A fuel conversion reactor according to claim 4, said secondary shell member further comprising a secondary inner shell member and, said shell-and-tube heat exchanger further comprising: a further passageway formed between said secondary inner shell member and said outer shell and extending from said first end to said second end of the secondary inner shell member, for flow of a mixture of said fuel and said gaseous fluid therethrough.

19. A heat exchanging apparatus according to claim 1, wherein baffle plates are mounted within said primary shell member between said first tube sheet and said second tube sheet device.

20. A fuel conversion reactor comprising a shell-and-tube heat exchanger for heating a gaseous fluid prior to reaction with a fuel and for cooling a gaseous mixture produced by the reaction, said heat exchanger comprising:

a primary shell member having primary and secondary ends and a sidewall extending between said ends and defining a heat exchanging chamber located within the shell member;

an inlet for introducing said gaseous fluid into said heat exchanging chamber;

a first tube sheet fixedly mounted on said primary shell member in the vicinity of said primary end and sealingly closing said heat exchanging chamber at one end of the chamber;

a second tube sheet device which is separate from said primary shell member and is located in the vicinity of said secondary end, said second tube sheet device forming another end of said chamber that is opposite said one end of the chamber;

one or more outlet apertures are formed in the region of said secondary end of said primary shell member in order to provide at least one outlet for said gaseous fluid which flows through said heat exchanging chamber on a shell-side thereof during operation of said fuel conversion reactor;

a plurality of heat exchange tubes extending from said first tube sheet to said second tube sheet device and rigidly connected to both the first tube sheet and the second tube sheet device, said heat exchange tubes providing passageways for said gaseous mixture to flow inside the tubes through said heat exchanging chamber; and an outer shell having first and second ends and an outer shell wall extending between said first and second ends, said outer shell being closed at said second end, extending around said primary shell member and said second tube sheet device, and having an inlet for said fuel, wherein a fuel passageway is formed between said outer shell wall and said sidewall of the primary shell member and extends from said inlet for the fuel to said one or more outlet apertures.

21. A fuel conversion reactor comprising a shell-and-tube heat exchanger for heating a gaseous fluid prior to reaction with a fuel and for cooling a gaseous mixture produced by the reaction, said heat exchanger comprising:

a primary shell member having primary and secondary ends and a sidewall extending between said ends and defining a heat exchanging chamber located within the shell member;

an inlet for introducing said gaseous fluid into said heat exchanging chamber;

a first tube sheet fixedly mounted on said primary shell member in the vicinity of said primary end and sealingly closing said heat exchanging chamber at one end of the chamber;

a second tube sheet device which is separate from said primary shell member and is located in the vicinity of said secondary end, said second tube sheet device forming another end of said chamber that is opposite said one end of the chamber;

one or more outlet apertures are formed in the region of said secondary end of said primary shell member in order to provide at least one outlet for said gaseous fluid which flows through said heat exchanging chamber on a shell-side thereof during operation of said fuel conversion reactor; and a plurality of heat exchange tubes extending from said first tube sheet to said second tube sheet device and rigidly connected to both the first tube sheet and the second tube sheet device, said heat exchange tubes providing passageways for said gaseous mixture to flow inside the tubes through said heat exchanging chamber;

wherein said second tube sheet device includes a secondary shell member having a peripheral sidewall with a first predetermined diameter and a coaxial sleeve extension extending from said peripheral sidewall at an end thereof closest to said secondary end and having a second predetermined diameter different than said first predetermined diameter, wherein said sleeve extension has a free end located in the region of said one or more outlet apertures which are formed at or near said secondary end of said primary shell member, and wherein said secondary shell member is relatively movable during use of said fuel conversion reactor between a first position wherein said one or more apertures are partially blocked by said sleeve extension and a second position where said one or more apertures are at least substantially open for passage of said gaseous fluid.

* * * * *